No. 737,169. PATENTED AUG. 25, 1903.
E. W. STEVENS.
MACHINE FOR MOLDING ARTIFICIAL STONE.
APPLICATION FILED JAN. 7, 1903.
NO MODEL. 7 SHEETS—SHEET 1.

Witnesses
Inventor
Ervin W. Stevens.
by Ellis Spear & Company
Attorneys

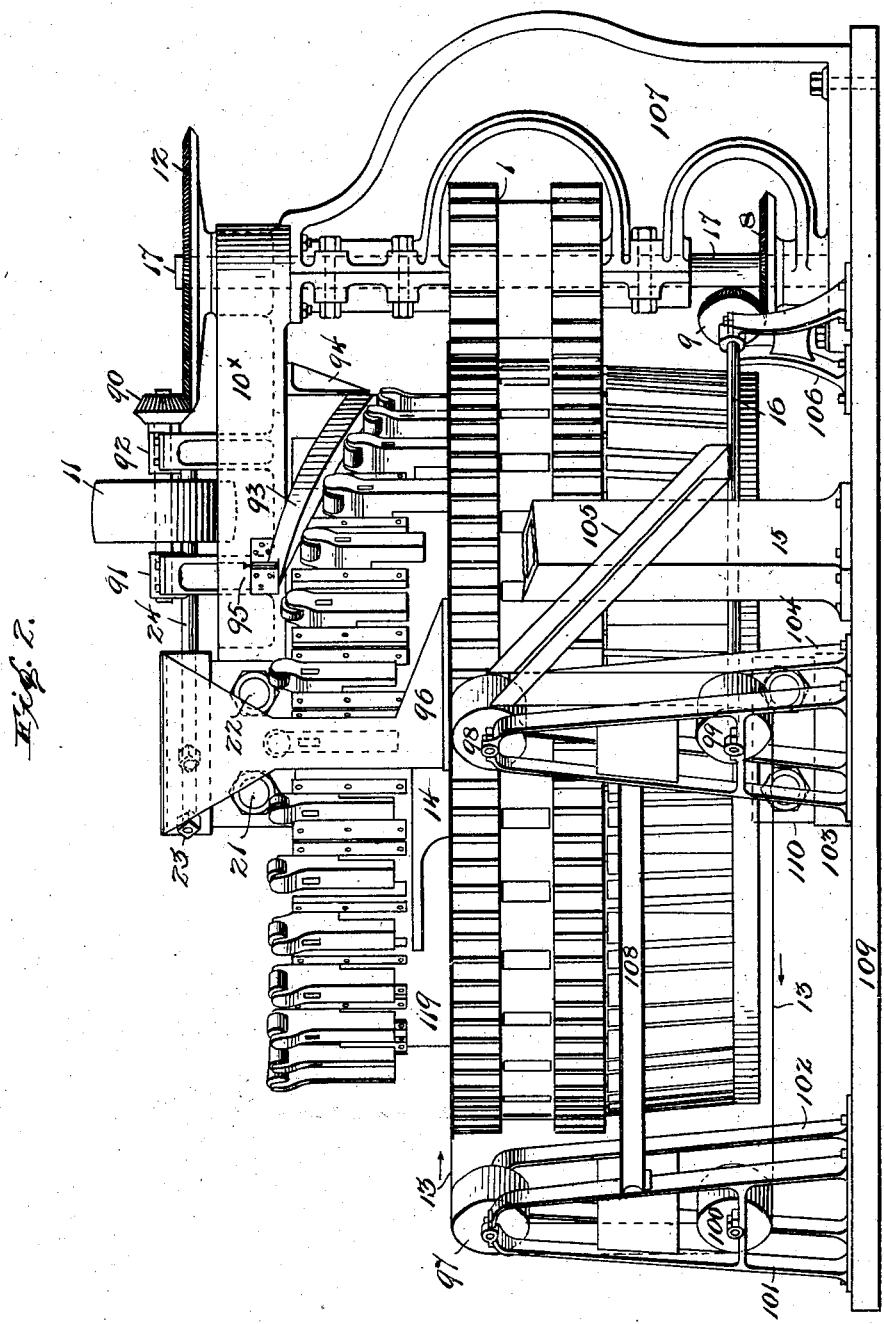

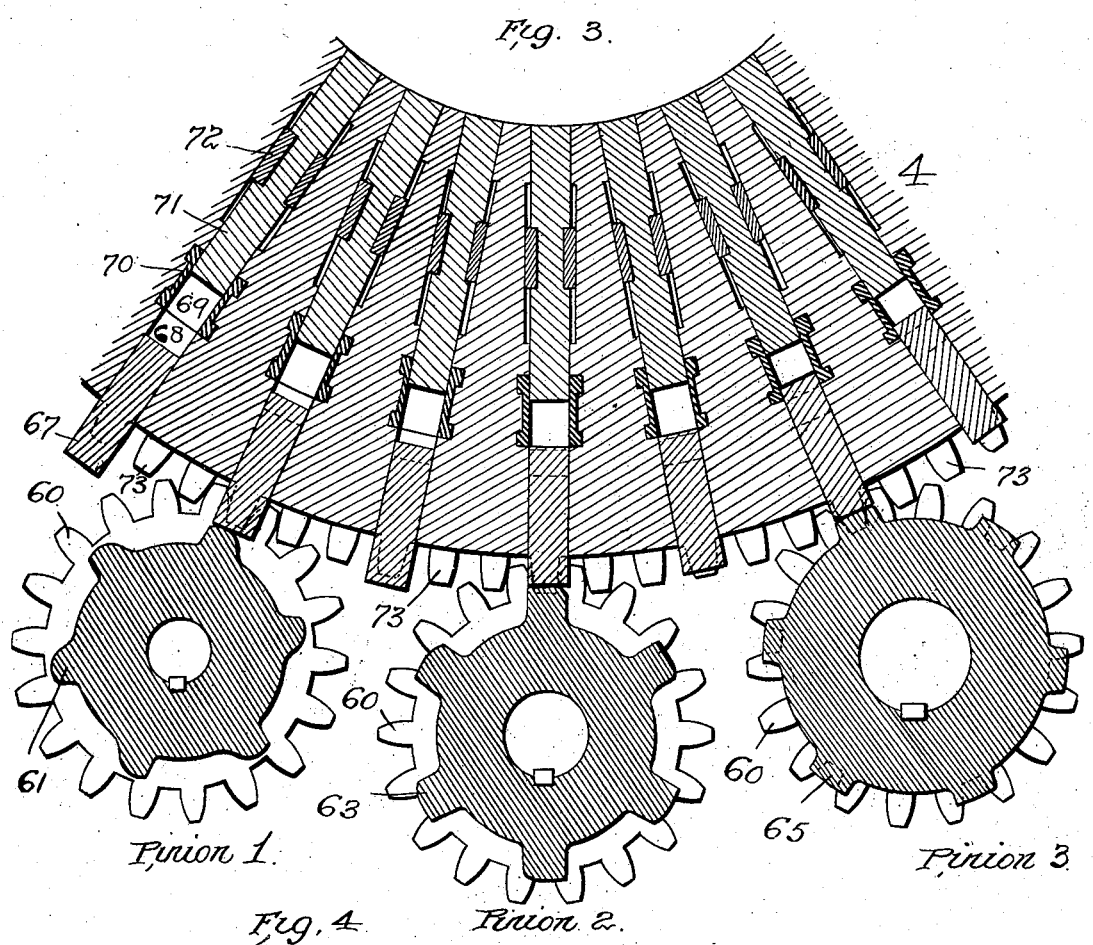

No. 737,169. PATENTED AUG. 25, 1903.
E. W. STEVENS.
MACHINE FOR MOLDING ARTIFICIAL STONE.
APPLICATION FILED JAN. 7, 1903.
NO MODEL. 7 SHEETS—SHEET 4.
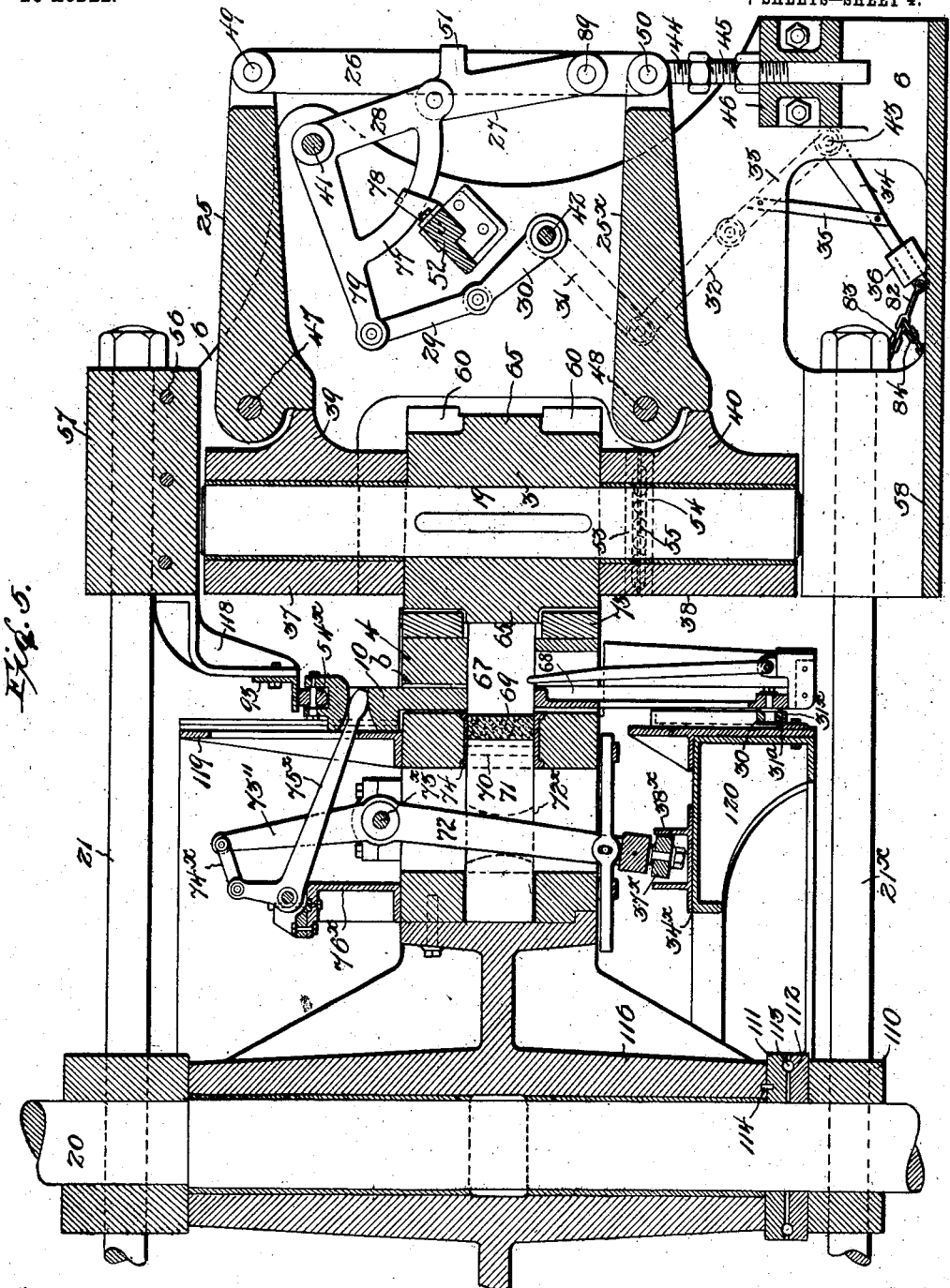
Witnesses: Inventor;
Ervin W. Stevens
by Ellis Spear & Company
Attorney No. 737,169. PATENTED AUG. 25, 1903.
E. W. STEVENS.
MACHINE FOR MOLDING ARTIFICIAL STONE.
APPLICATION FILED JAN. 7, 1903.
NO MODEL. 7 SHEETS—SHEET 5.

Attest:
C. A. Maaston
Edward Sarton

Inventor,
Ervin W. Stevens,
by Ellis Spear & Company
Attys.

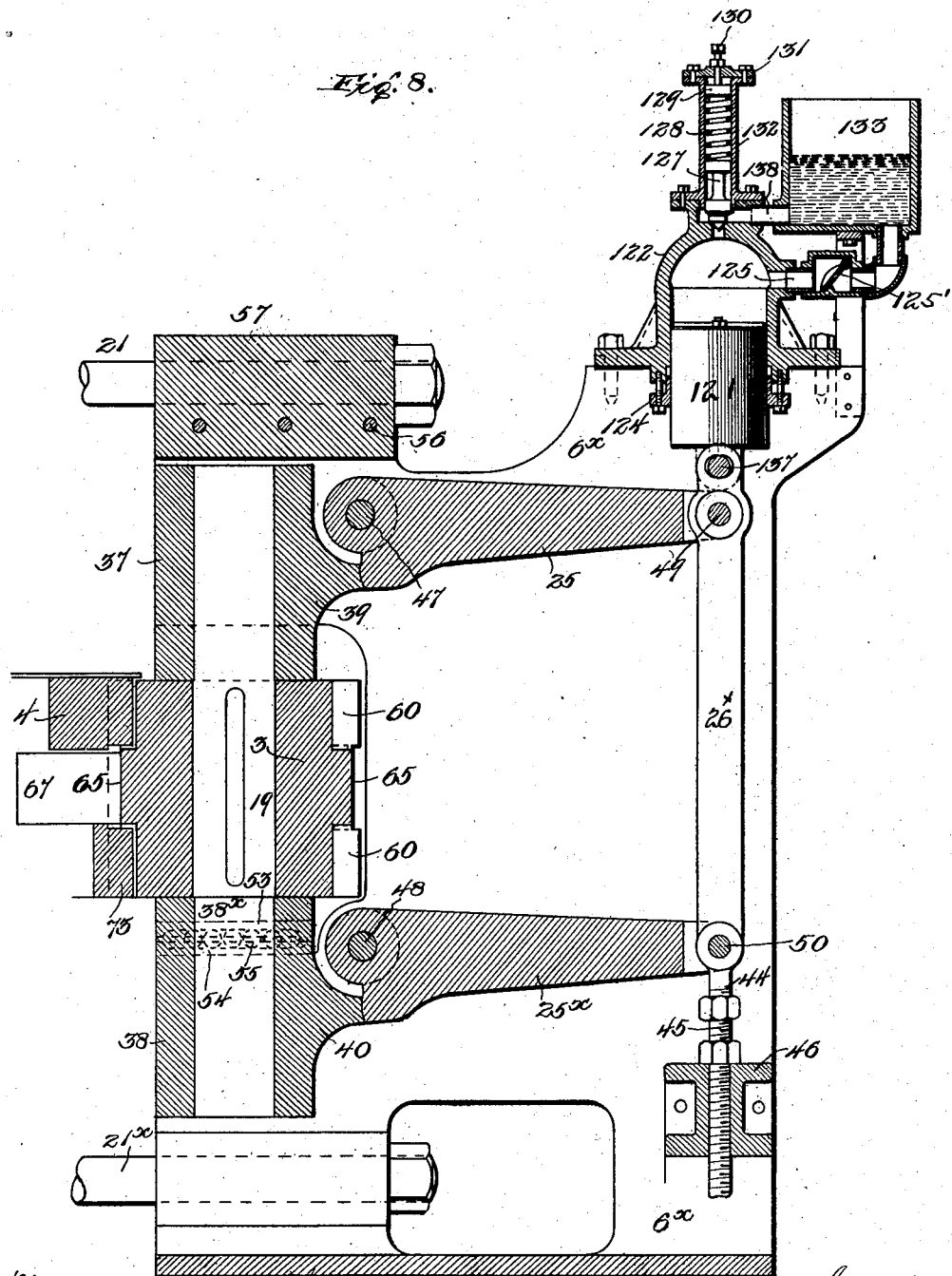

No. 737,169. PATENTED AUG. 25, 1903.
E. W. STEVENS.
MACHINE FOR MOLDING ARTIFICIAL STONE.
APPLICATION FILED JAN. 7, 1903.
NO MODEL. 7 SHEETS—SHEET 7.
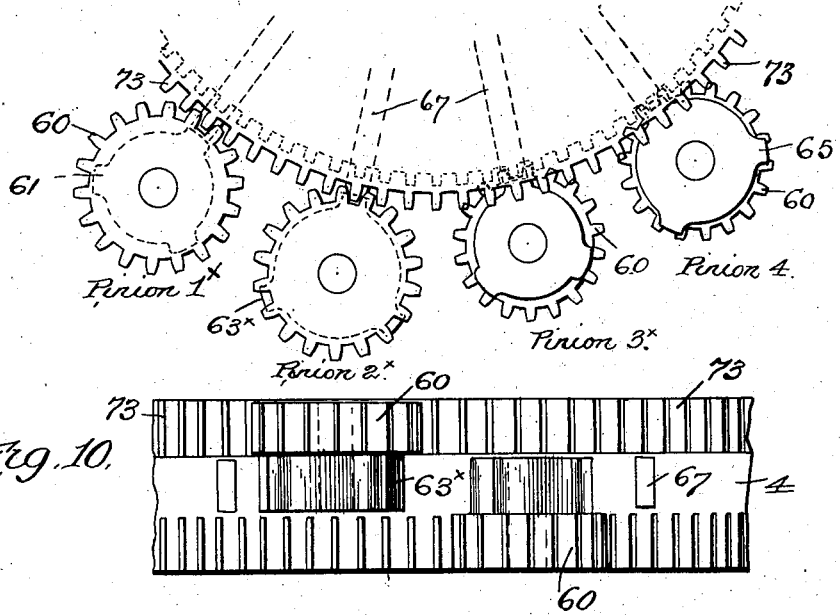
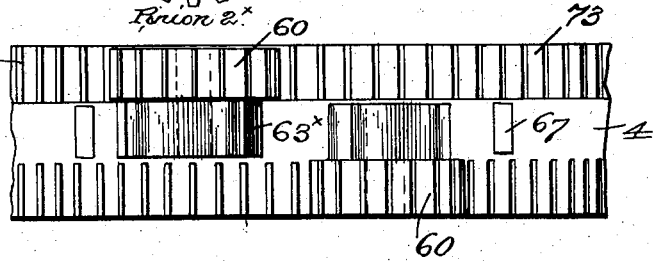

No. 737,169. Patented August 25, 1903.

UNITED STATES PATENT OFFICE.

ERVIN W. STEVENS, OF NORRISTOWN, PENNSYLVANIA.

MACHINE FOR MOLDING ARTIFICIAL STONE.

SPECIFICATION forming part of Letters Patent No. 737,169, dated August 25, 1903.

Application filed January 7, 1903. Serial No. 138,178. (No model.)

*To all whom it may concern:*

Be it known that I, ERVIN W. STEVENS, a citizen of the United States, residing at Norristown, Montgomery county, Pennsylvania, have invented certain new and useful Improvements in Machines for Molding Artificial Stone, of which the following is a specification.

My invention relates to the form of machine disclosed in the application for Letters Patent of the United States, Serial No. 123,604, filed September 16, 1902. My present machine is designed for making blocks of a different shape from those produced by the machine shown in the said application. The former machine was adapted to make short blocks and was provided with a spring relief mechanism to relieve unusual pressures. My present machine is intended to make elongated blocks and of larger size than my former machine and is intended to dispense with springs as the relief means. I also aim in my present invention to reduce the friction or rubbing action between the parts to a minimum, and particularly is this reduction of frictional contact noticeable between the plungers of the mold-wheel and the wheel which is employed to operate the said plungers longitudinally.

The features of my invention will be hereinafter described, and particularly pointed out in the claims.

Figure 1:
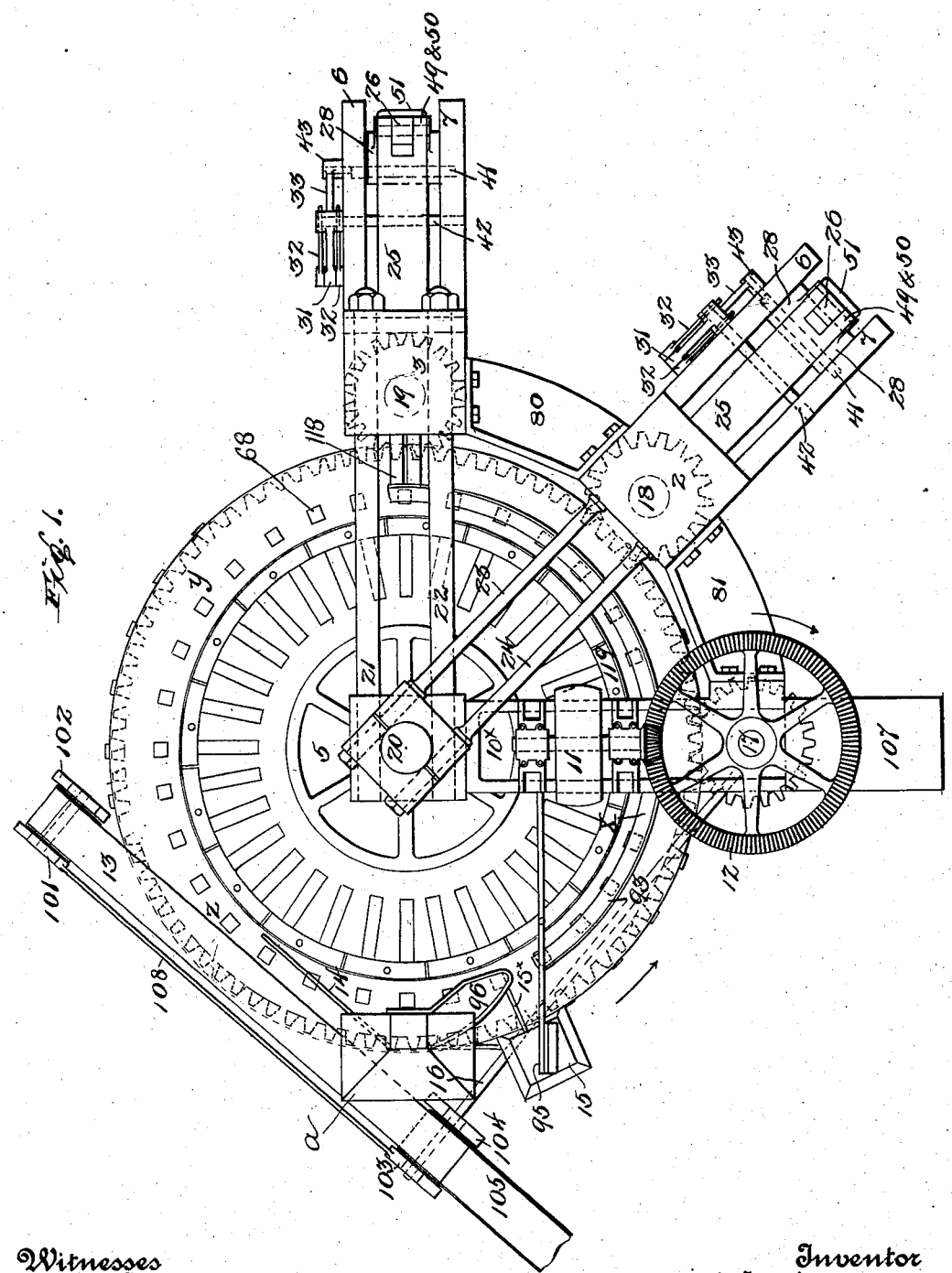
Figure 6:
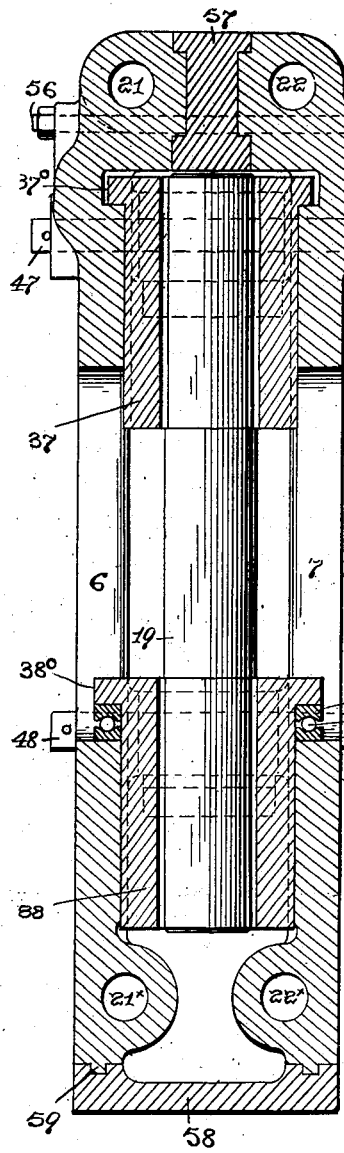
Figure 7:
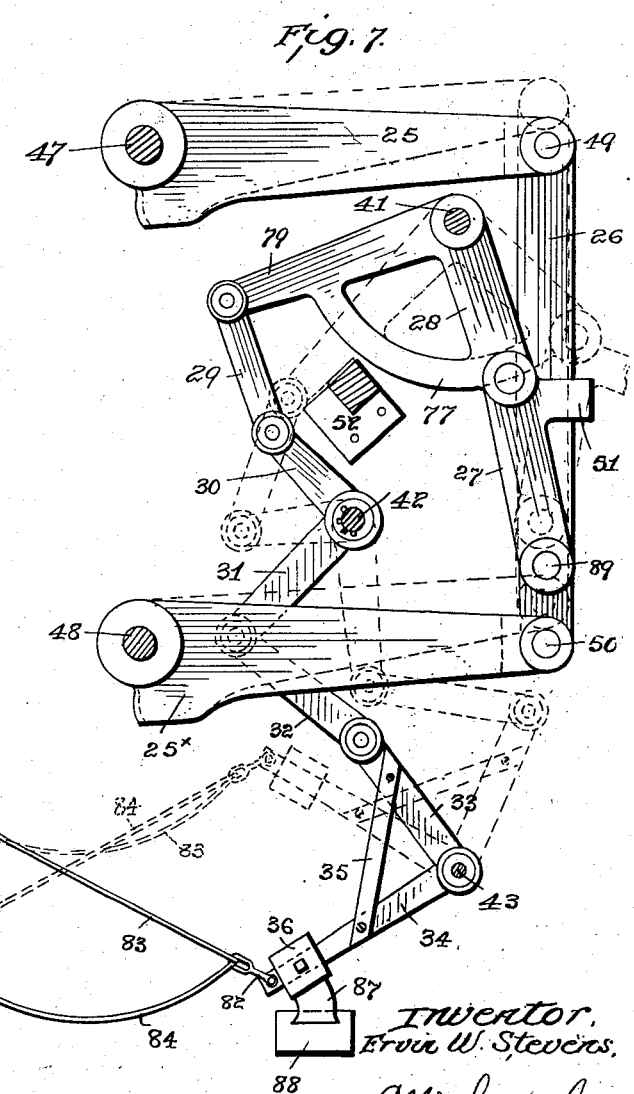

In the accompanying drawings, Figure 1 is a plan view of the machine with parts omitted. Fig. 2 is an elevation looking from the left of Fig. 1. Fig. 3 is a detail sectional plan view of a part of the mold-carrier and the wheels for operating the plungers of the mold-wheel. Fig. 4 is a detail view of the plunger-operating wheel. Fig. 5 is a detail view, in vertical section, with parts in elevation, of the relief mechanism. Fig. 6 is a detail view in section of the shaft for carrying the plunger-operating wheel, parts being shown in section. Fig. 7 is a diagrammatic view of the relief connection with different positions of the same indicated in dotted lines. Fig. 8 is a detail view, in vertical section, of another form of relief mechanism.

My present machine comprises, like that disclosed in my aforesaid application, a mold-wheel for carrying a plurality of plungers 67 68 71 and an upper plunger 10, the plungers 67 and 71 operating horizontally and the material being compressed by the inward movement of the plunger 67 under the action of the plunger-driving wheels arranged around the periphery of the mold-wheel and operated in substantially the same manner as the wheels in my said application. The upper plunger 10 and the lower plunger 68 operate vertically to cause the material to be moved into alinement with the plunger 67 and to cause the discharge of the completed block from the cavity in the mold-wheel. These parts will be more particularly described hereinafter. A ring 119 on the mold-wheel supports and guides the upper plunger.

The driving-pulley 11 of the machine is fixed on a shaft supported in bearings 91 and 92 and carrying a beveled pinion 90, intermeshed with a beveled gear-wheel 12, keyed to an upright shaft 17, which carries a wheel 1, having teeth 60 to engage corresponding teeth on the mold-wheel to drive the same. There are two sets of teeth 60 on the wheel 1, Fig. 4 being a view of pinion 2, but also illustrating the general features of the other pinions, and these two sets of teeth are arranged with a space between them and they engage two sets of teeth on the mold-wheel. The mold-wheel travels about a vertical shaft 20 in the direction of the arrow shown in Fig. 1. Intermediate of the teeth 60 on the drive-wheel shown in Fig. 3 teeth 61 are arranged, adapted to engage the ends of the plungers 67 in succession and force the same inwardly for the compressing action on the plastic material. Two other wheels, marked 2 and 3, are employed similarly to the wheel 1, each having two sets of teeth 60 and having in the space between these teeth a series of projections or teeth, marked, respectively, 63 and 65. These wheels, except the first, are idlers and are supported by shafts 18 and 19, which are held in position by bearings supported on housings 6 and 7, these housings being connected by braces 80. 81 is a further brace for the housings of the shaft 18. These housings and the beam 10$^\times$ are also connected to the center shaft 20 of the mold-wheel by bolts 21, 22, 23, and 24.

As shown in Fig. 1, a delivery-belt 13 is arranged at the left of the machine, and the completed blocks after they have been lifted from the cavities in the mold-wheel by the rise of the plungers 68 will be engaged by a push-off bar 14 and thrown onto the delivery-belt 13, which carries them to a spout 105. The hopper for the plastic material is shown at $a$, and it has a foot 96 overlying the upper surface of the mold-wheel, with its end in the path of the vertical openings or cavities in which the plungers 10 and 68 operate, the said cavities being marked $b$, and as these cavities are brought around in succession beneath the spout or foot 96 the material will be drawn into the vertical cavities by the suction of the downwardly-moving plunger 68, this action being similar to that described in the application referred to.

15 indicates a standard to which is connected an I-beam 95, and to the latter is fastened the inclined cam 93, which operates the upper plungers 10 or serves to force the same downwardly, the said cam extending under two other supports—namely, the beam 10, to which it is connected by a bracket 94, and a bracket 118.

107 indicates a standard having near its lower end a gap in which is located a bevel gear-wheel 8, fixed to the shaft 17, this gear-wheel meshing with a beveled pinion 9 on a shaft 16, having thereon a drum 99, the said shaft being supported in bearings on a standard 106 and a standard 103 104. This drum 99 drives the belt 13, which passes over three other drums 98, 97, and 100, the drum 98 being journaled at the top of the standard 103 and the drums 97 and 100 being journaled in the standard 101 102. A beam or strut 108 connects the standards 101 and 103.

109 represents the sole-plate of the whole machine.

The wheel 1 is not intended to yield when there is an overcharge of material in the mold, because it is the first to exert pressure on the plungers and the material under this first pressure is yet loose and soft, so that excessive pressure is not likely to occur at this point. The plungers 67 project some distance, as will be seen in Fig. 3, beyond the teeth 73 of the mold-wheel 4. As the mold-wheel turns these plungers are first brought into contact with the rounded surfaces 61 of the intermediate teeth on the wheel 1 and they are driven part way in, as shown. After leaving the wheel 1 the plungers are still projecting a slight distance beyond the teeth 73, and they are next operated upon by the rounded corners of the teeth 63 of the wheel 2. The rounding of these teeth is slightly less than that necessary on the wheel 1, because the line of contact is nearer to the pitch-line of the teeth 60, which are driven by those of mold-wheel 4. After leaving the wheel 2 the plungers are slightly within the line of the outer ends of the teeth 73 and are quite near the pitch-line of said teeth, so that the driving-teeth 65 on the third pinion will strike the plungers more directly than in either of the preceding cases, and the teeth 65 of this third pinion or wheel will now press the plungers inwardly just enough to bring the contact-line to coincide directly with the pitch-line of the teeth 60 and 73. By this means there will be no motion of translation of the end surfaces of the teeth 65 and of the end surfaces of the plungers, as both of these surfaces are moving with exactly the same velocity at the instant when the final or the heaviest pressure is exerted, and as there is no motion of translation of one surface in relation to the other there will be no rubbing frictional action between these surfaces. In the cases of the wheels 2 and 1 the conditions are not so favorable for preventing frictional contact—as, for instance, with the pinion 2 the point of contact is a little way out from the pitch-line and the end of plunger will move slightly faster than the driving-teeth 63 and slight rubbing action will occur; but as the pressure at this point is much less than at wheel 3 it is negligible, and in a like manner the pinion 1 has a much greater rubbing action with its driving-teeth 61 on the ends of the plungers than either of the other two wheels; but at this point the pressure is the least, as the material is in its loose state, and the rubbing action here is also negligible.

From the above it will be seen that I arrange the parts so that the greatest motion of translation between the driving members and plungers will occur where the pressure required is the least, and where the final or greatest pressure is to be applied the driving member and plunger contact on the pitch-line, where there is no motion of translation of one surface in relation to the other, and consequently no rubbing or frictional action. In order to accomplish this effect, I divide the faces of the mold-wheel and plunger-driving wheels each into three zones, as shown in Fig. 4, so that the gear-teeth and the plunger-driving teeth may be independent of each other both as regards spacing or the interval between them and the length of the teeth in the several zones. When making very thick blocks, I prefer to use two pitch diameters for the mold-wheel. For instance, the top zone or row of teeth will have a greater and the bottom zone of teeth a less pitch diameter than is shown herein, and with such a mold-wheel I associate four or more plunger-driving wheels with but one row of motion or gear teeth on each one. The driving-pinion $1^\times$, Fig. 9, and idle pinion $2^\times$ engage the upper row of teeth on the mold-wheel, while pinions $3^\times$ and 4 in the same figure engage the lower row of teeth on the mold-wheel, and the plunger-driving teeth $63^\times$ on pinion $2^\times$ and 65 on pinion 4 make contact on their respective pitch-lines, while pinions $1^\times$ and $3^\times$ make contact a little way out from the mold-wheel pitch-lines. In this way the successive pressing action can take place substantially on the pitch-line of the intermeshing gear-teeth. This form of machine is simply another embodiment of the invention disclosed in Fig. 3, where one series of wheels is shown consisting of three pinions, and there might be another series like them in the same machine, for which purpose it would be necessary only to have the two sets of driving-teeth on the mold-wheel with pitch-lines of different diameters.

Referring to Fig. 5, the machine is shown when pressing a block to the fullest degree, the space 69 being filled with compressed material or artificial stone. In this form of machine the pinions 2 and 3 are arranged to yield when the maximum pressure is passed, and for this purpose the pinions are similarly mounted, Fig. 5 being representative of such mounting and showing the arrangement in connection with wheel 3 only. The pinion or wheel 3 is carried by the shaft 19, which turns in two bushed bearings 37 and 38, having flanges $37°$ $38°$, Fig. 6. These bearings are of rectangular form and fit between the housings 6 and 7, which have ledges or surfaces to form supports for the flanges $37°$ $38°$ of the bearings. The lower bearing has antifriction-balls 55 associated therewith between guide-strips 53 and 54. This arrangement allows the bearings 37 and 38 to slide easily from left to right and the reverse in Fig. 5 between the housings 6 and 7. Each bearing has a projection 39 or 40 bearing against part of levers 25 $25^×$, pivoted at 47 and 48 between the housings. The outer ends of these levers are connected by a link 26 at 49 and 50, respectively. The lower end of the link 26 has a projection 44 resting on an adjusting-screw 45, passing through a girth 46, belted to the housings 6 and 7. By this arrangement the wheel 3 may be accurately adjusted to the pitch-line of the mold-wheel. On the link 26 and on both sides thereof a double toggle-lever is pivoted at 89, such toggle-lever being marked 27 and 28 and being pivoted to a shaft 41, extending through the housings. The member 27 of the double toggle-lever has a connection 51 extending around the edge of the link 26 to contact therewith, thus preventing the toggle-levers 27 28 from bending too far to the left. Formed in one piece with the member 28 are the members 77 79, which are guided by a clip 78 on a stop-bar 52, bolted to the housings. The second toggle 29 30 is pivoted to the arm or member 79, the said second toggle being secured to a rocking shaft 42, which extends through both housings and beyond the one marked 6. On the outer end of this extension of the shaft 42 an arm 31 is fixed, to which is pivotally connected a pair of links 32, connecting it to an arm 33, secured to a rock-shaft 43. It has also an arm 34, loaded with a weight 36. The parts 31 32 constitute a third toggle, and the parts 33 and 34 move as one piece, being connected by a tie-bar 35. A clevis 82 is pivoted to the end of the weighted arm 34, and to this clevis are connected two chains 83 and 84, the other ends of which are secured to studs 85 and 86, screwed to the outer sides of the housing 6. The housings 6 and 7 have openings to receive the bolts 21 22 and also bolts $21^×$ and $22^×$, and these housings are connected together at their upper ends by two or more bolts 56, a distance-block 57 being located between them. At their lower ends the housings rest upon a sole-plate 58, which has grooves 59 to receive projections from the housings. When excessive pressure occurs at, for instance, the wheel 3, the latter moves toward the right, Fig. 5, thus lifting the levers 25 $25^×$ by pushing thereagainst, thus lifting the link 26, as shown in Fig. 7 in dotted line, all of the arms and toggle-levers moving from their normal position shown in Fig. 5 to that shown in dotted lines, Fig. 7, thereby lifting the weight 36 until the chain 84 becomes taut, at which time the weight 36 will fly back and strike the abutment or anvil 87, which is held in a heavy base 88, resting upon a suitable elastic foundation. In this action the chain 83 will modify the violence of the blow of the weight 36 and will prevent the rebound of the said weight.

Referring to Fig. 8, I show another form of the relief mechanism adapted to a machine running slower than that before described. In this instance the link $26^×$ is similar to the link 26, excepting that instead of having a system of toggle-levers and a weight connected therewith the said link is associated with hydraulic relief mechanism. The said link is provided with an extension at the top, to which is pivoted loosely a ram 121, having an ear through which a connecting-pin 137 extends. This ram extends through a packing-gland 124 and into a cylinder 122, which is connected by a passage 125 with a reservoir 133, the cylinders also connected by way of a passage 138 with the said reservoir, this passage being controlled by a valve 127, pressed normally downwardly by the spring 128, the tension of which is adjusted by a follower 129, adjusted by a screw 130, the said spring and valve being contained in a casing 132. A check-valve 125' is located in the passage 125. Supposing the cylinder 122 to be filled with liquid, when excessive pressure comes upon the plunger-driving wheel 3 the levers 25 and $25^×$ will rise, lifting the link $26^×$ and the ram 121, overcoming the resistance of the liquid in the cylinder 122, causing the valve 127 to open, so that the said liquid will then be free to pass through the passage 138 into the reservoir 133. When the excessive pressure between the plungers 67 and the wheel 3 has been removed or reduced, the ram and lever mechanism will fall by their own weight, thus moving the bearings 37 and 38 in their housings 6 and 7 toward the mold-wheel and restoring the plunger-driving wheel 3 or 2, as the case may be, to its normal position, and when the ram moves downwardly the check-valve 125' will open, allowing the liquid to flow from the reservoir 133 into the cylinder 122, where it will be trapped by the closing of the valve 127 and by the check-valve 125', which closes toward the reservoir 133. The reservoir 133 may be elevated to any desired extent.

The operation of the machine is as follows: The material passes from the feed-hopper $a$, which is supported above the mold-wheel, so as to rest upon the upper surface of the mold-wheel, to be carried by the movement thereof into the foot or extension 96, where it overlies the path of the vertical cavities $b$ of the mold-wheel. The mold-cavities have vertically-extending linings 70 and horizontally-extending linings 74. The first action is that of introducing the material to the mold-cavities, which is caused by the descent of the plungers 68, which have rollers $31^a$ at their lower ends controlled by cams $31^{\times}$. As these plungers 68 descend they are passing the foot 96 and they suck in sufficient material to form a block. Immediately after this action takes place the upper plungers 10 descend, this being due to rollers $54^{\times}$ of such plungers passing beneath and being forced down by the cam or incline 93. The roller of the upper plunger comes under the said cam 93 at the point where the I-beam 95 is located, Fig. 1. From this point the cam 93 slants downwardly, causing the plungers to descend in succession, as indicated in Fig. 2, till they reach the lowest point of the cam 93 at X, Fig. 1. They remain in this lowermost position, as the cam 93 now presents a horizontal portion to the rollers throughout the remainder of its extent or up to the point at which the bracket 118 is located, Fig. 1, this point being opposite the plunger-driving wheel 3. At each of the wheels 1, 2, and 3 the compression-plungers 67 are driven part way in, being fully pressed inwardly when axially in line with the center of the wheel 3. From this point to the point Y the resistance blocks or plungers 71 move in succession outwardly and the top plungers 10 rise. This action causes the compressed block to be moved by the plungers 71 into alinement with the vertical cavities $b$. From point Y to point Z the blocks which have been compressed are lifted to the surface of the mold-wheel, and at the point Z they stand on end alongside of the belt 13, which moves with the same velocity as the mold-wheel at that point. The pusher-bar 14 now causes the completed block to be moved radially in respect to the mold and onto the belt to be discharged thereby, the said push-off bar being fixed in relation to the movement of the mold-wheel and the belt. Under the action of the push-off bar the block is tipped over onto the belt. The resistance blocks or plungers 71 are operated by levers 72, having rollers $37^{\times}$ thereon engaging stationary cams $38^{\times}$, secured to a stationary platform $34^{\times}$, to which also the cam $31^{\times}$, before described, is fixed. The lever 72 passes through a recess $72^{\times}$ on the plunger 71, and it is pivoted to the mold-wheel at $73^{\times}$. The lever has an upward extension $73''$, connected by a link $74^{\times}$ with a lever $75^{\times}$, pivoted to a ring or bracket $76^{\times}$, bolted to the mold-wheel. The levers $75^{\times}$ engage at their free ends with the plungers 10 to raise the same as the resistance blocks or plungers 71 move outwardly to push the completed block into line with the vertical cavity $b$. As the blocks are compressed by the several wheels 1, 2, and 3 the said wheels are held unyieldingly in their action so long as the maximum pressure predetermined on is not exceeded; but when the pressure becomes greater than that for which the machine is set then the wheels 2 and 3 will yield with a constantly-diminishing resistance as the said wheels move away from the mold-wheel. This action takes place whether the weight relief mechanism is employed or the hydraulic mechanism. The amount of pressure which the wheels 2 and 3 will sustain without yielding may be varied by moving the weight 36 along the arm 34, a little change at this point making a difference of several turns at the wheel 2 or 3 and the same effect can be secured in the hydraulic relief mechanism by the adjustment of the spring 128.

By reference to Fig. 1 it will be seen that there are a less number of plunger-driving teeth than there are motion-transmitting teeth on each of the plunger-driving wheels and the mold-wheel. This feature is of importance. In the present instance I employ ninety teeth around the mold-wheel and thirty plungers or thirty spaces of twelve degrees each. The plunger-driving wheels or the pinions 1, 2, and 3 are arranged around the mold-wheel through a space of ninety degrees—that is to say, the wheel 1 is located with its center forty-five degrees distant from the axis of the wheel 2, and there is a space of forty-five degrees between the axes of wheels 2 and 3. As forty-five and ninety are neither of them multiples of twelve, it will be seen that no two drive wheels or pinions will be pressing the plungers at one and the same time. For instance, when a plunger is axially in line with the center of wheel 3 the plunger which is nearest to the pinion or wheel 2 will be three degrees in the rear of being in radial line with said pinion, while pinion 1 will be located half-way between the two plungers. By this arrangement it will be seen that the load or weight is more evenly distributed and the maximum pressures of which the several plunger-driving wheels are capable occur in succession instead of simultaneously. Referring again to the push-off bar, it will be seen from Fig. 2 that this bar has a portion elevated above the surface of the mold-wheel and another portion which lies upon said upper surface and serves as a scraper to remove loose particles of the material which fall off from the blocks.

As shown in Fig. 5, the mold-wheel is supported upon ball-bearings consisting of balls 113, arranged between hardened rings 111 and 112, the former of which is connected so as to turn with the hub 116 of the mold-wheel by dowel-pins 114. The ring 112 rests upon the fixed block 110. A brace $15^\times$ connects the foot of the hopper with the standard 15.

I claim as my invention—

1. In combination in a molding-machine a mold-wheel, a plurality of plungers carried thereby, and means for driving the said plungers consisting of a plurality of wheels disposed about the periphery of the mold-wheel, said wheels acting one at a time to drive the plungers, substantially as described.

2. In combination in a molding-machine a molding-wheel having motion-transmitting teeth, radial plungers having their ends projecting normally beyond the points of the motion-transmitting teeth and means for driving the mold-wheel, substantially as described.

3. In combination in a molding-machine a mold-wheel having motion-transmitting teeth and a plurality of plungers, initial pressure means for the plungers and a tooth-wheel engaging with the teeth of the mold-wheel and having means for operating the plungers to effect the final pressure substantially on the pitch-line of the intermeshing teeth, substantially as described.

4. In combination with a mold-wheel having motion-transmitting teeth and plungers, initial pressure means for the plungers and a pinion engaging the said teeth of the mold-wheel and having a portion or portions to contact with the ends of the plungers to effect the final pressure, substantially on the pitch-line of the intermeshing teeth, substantially as described.

5. In combination with a mold-wheel having motion-transmitting teeth a plurality of pinions each having motion-transmitting teeth and a less number of pressure-teeth, said pinions being arranged progressively with respect to the length of their teeth or the nearness of said teeth to the center of the mold-wheel, substantially as described.

6. In combination with a mold-wheel having radial plungers a series of pinions having motion-transmitting teeth meshing with similar teeth on the mold-wheel, pressure-teeth arranged in a circle of less diameter than the pitch-circle of the motion-transmitting teeth, the last pinion of the series having its pressure-teeth exactly coincident with the pitch-circle of the motion-transmitting teeth, substantially as described.

7. In combination with a mold-wheel having motion-transmitting teeth, a series of plungers arranged to project beyond the motion-transmitting teeth, a series of pinions each having teeth to engage the teeth of the mold-wheel and having also teeth to operate the plungers, the plunger-operating teeth on one of the pinions having rounded ends and the plunger-operating teeth of the last pinion having their ends coincident with the pitch-line of the motion-transmitting teeth, substantially as described.

8. In combination with a mold-wheel having plungers and motion-transmitting teeth, a pinion having teeth meshing with those of the mold-wheel and having means to operate the plungers, a shaft upon which the pinion is supported, bearings 37 and 38 for the said shaft, housings between which the bearings are located, the said housings having slideways for the movement of the bearings, one of which comprises antifriction means and means for resisting the movement of the bearings, substantially as described.

9. In combination with a mold-wheel having motion-transmitting teeth and compressing-plungers, a pinion engaging the teeth of the mold-wheel and having means for operating the compressing-plungers, movable bearings for the said pinion and yielding means for resisting the movement of the said bearings comprising a system of toggle-levers and a weight, substantially as described.

10. In combination with a mold-wheel having plungers, a wheel for operating said plungers, yielding bearings for the said wheel, a pair of levers 25 $25^\times$ engaged by the bearings, a link connecting said levers and means for yieldingly resisting the movement of the said levers, substantially as described.

11. In combination with a mold-wheel a belt arranged adjacent thereto, means for driving the belt and the push-off bar extending over the mold-wheel to push the blocks therefrom onto the belt, said push-off bar having an elevated portion and also a portion resting on the mold-wheel to act as a scraper, substantially as described.

12. In combination with a mold-wheel having two rows of motion-transmitting teeth one of which has a greater pitch diameter than that of the other and a plurality of pinions having each a set of motion-transmitting teeth to engage one row of mold-wheel teeth and each having a portion to engage the plungers carried by the mold-wheel, the said portions engaging the plungers on the pitch-line of the intermeshed teeth at the moment of final pressure exerted by the said plunger-operating portions, substantially as described.

13. In combination a mold-wheel having a plurality of rows of motion-transmitting teeth and of which the pitch-lines are of different diameter, plungers carried by the mold-wheel and a plurality of pinions having each a set of motion-transmitting teeth to engage one row of mold-wheel teeth and each having a series of plunger-operating teeth the ends of which are respectively arranged to coincide with the pitch-line of the respective pinions, substantially as described.

14. A mold-wheel having two sets of motion-transmitting teeth around its periphery of different pitch-line diameters, a series of pinions having progressively-arranged sets of pressure-teeth and each having a set of motion-transmitting teeth to engage one row of the mold-wheel teeth and the second series of pinions with progressively-arranged pressure-teeth and each of the said second series having a set of motion-transmitting teeth to engage the other set of mold-wheel teeth, substantially as described.

15. In combination in a mold-wheel having a series of plungers a plurality of devices disposed about the said mold-wheel to operate the said plungers in succession, the said devices being arranged to act only one at a time on the plungers to distribute the load or work, substantially as described.

16. In combination, a mold-wheel having motion-transmitting teeth, a series of pinions having motion-transmitting teeth and also a less number of pressure-teeth plungers carried in said mold-wheel to be operated by the said pressure-teeth, bearings for said pinions, guideways in which said bearings slide and a series of levers and compound toggles with a weight arranged to hold said bearings from sliding until a predetermined pressure against said bearings is reached, substantially as described.

In testimony whereof I affix my signature in presence of two witnesses.

ERVIN W. STEVENS.

Witnesses:
CALVIN D. GROSS,
JAMES C. WAKELY.